ELECTROSTATIC INCREMENTAL DRIVE

Filed Dec. 31, 1958

United States Patent Office 2,995,285

Patented Aug. 8, 1961

2,995,285

ELECTROSTATIC INCREMENTAL DRIVE

Clyde J. Fitch, Endicott, N.Y., assignor to International Business Machines Corporation, New York, N.Y., a corporation of New York Filed Dec. 31, 1958, Ser. No. 784,297
12 Claims. (Cl. 226—156)

This invention relates to an electrostatic incremental drive unit and has for an object the provision of an electrostatic incremental drive suited for magnetic tape.

The present invention is particularly applicable to incremental low speed drives for magnetic tape for recording binary bits of information at random time intervals. In applications of this type the magnetic tape frequently is required to be advanced in small increments of about .005 inch at rates up to 500 steps per second. While precision mechanical ratchets or escapements may perform this function, the extremely high-frequency rate of operation required is not conducive to long life. The present system does not have this limitation.

It is a further object of the invention to provide an electrostatic incremental drive suited for high-frequency rate of operation and having a long life.

It is another object of the invention to provide incremental drive for a drive member using the electrostatic principle as a brake instead of a driver.

In accordance with the present invention there is provided an electrostatic incremental drive suited for magnetic tape comprising a rotor adapted for continuous rotation and having ring means thereon. The ring means includes a drive member for engaging the tape. Between the rotor and the ring means there is disposed friction means for driving the ring means with the rotor. The ring means is adapted to carry electrostatic resistance material in an encircling relation and a plurality of individual brake bands extend around and in engagement with the electrostatic resistance material. The individual brake bands are adapted to be selectively energized for locking at least one of the bands to the ring means and mechanical stop means is selectively effective on the ring means in timed relation with the selected energization of the brake bands to permit predetermined limited rotation of the drive member of the ring means after energization of the associated brake band.

More specifically, and in accordance with one form of the present invention, three rings are mounted on a continously-driven shaft and are normally driven with the shaft by a friction drive between the rings and a rotor carried by the shaft. A tape capstan is integral with one of the rings and each of the rings has bonded to its outer surface a band of electrostatic resistance material. Each of the bands of electrostatic resistance material is adapted to be respectively engaged by a brake band and the rings are held stationary against the friction drive when a voltage is applied to the brake bands. The rings are provided with overlapping projections and recesses whereby a voltage applied to one of the brake bands will be effective to limit the rotation of the other rings by reason of the overlapping relationship between the projections and recesses.

For further objects and advantages and for a more detailed description of the invention, reference may be had to the following description, taken in conjunction with the accompanying drawings in which.

Figures 1, 2, 3:
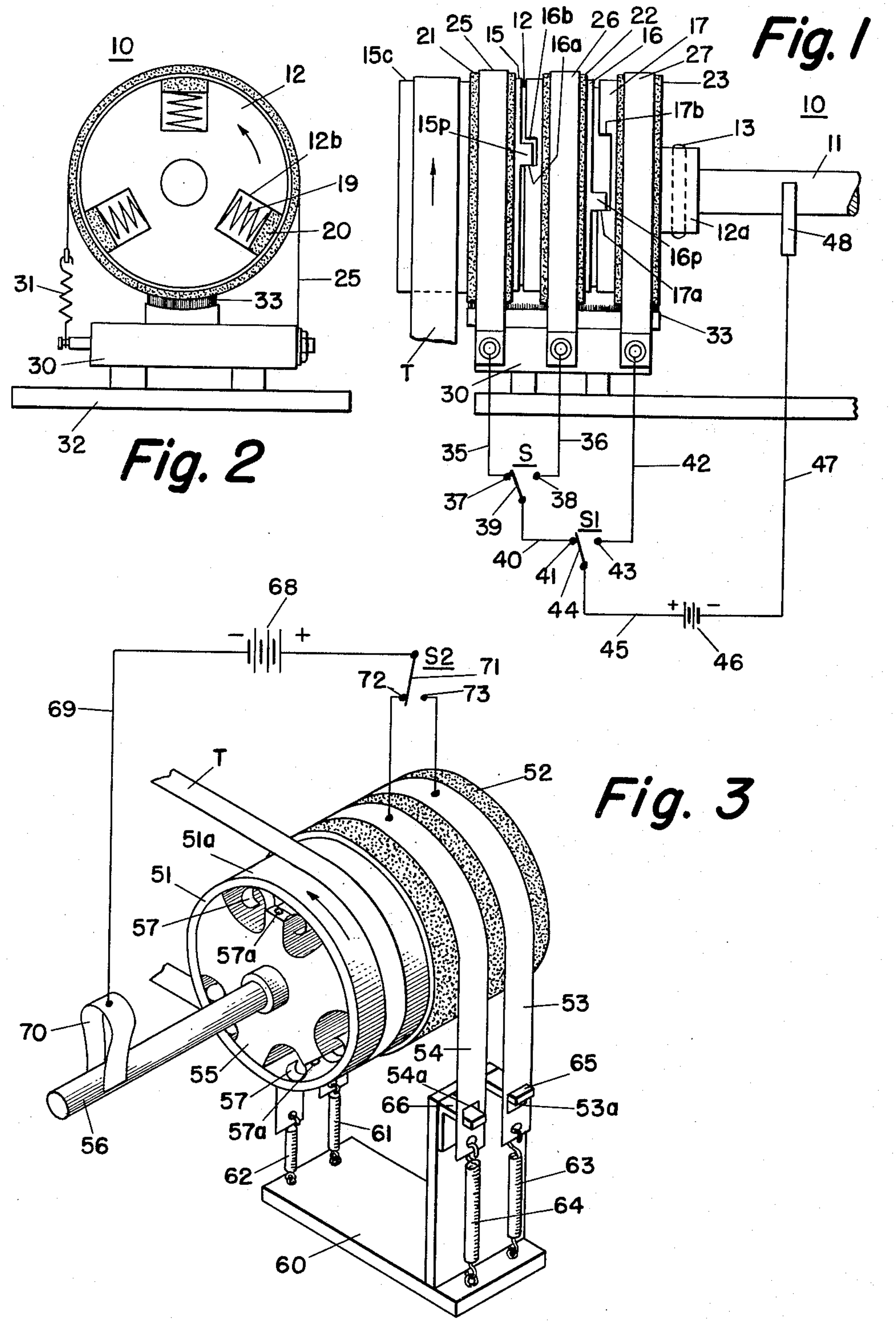
FIG. 1 is a schematic diagram of the present invention showing parts thereof in elevation.
FIG. 2 is a view taken from the left-hand end of FIG. 1.
FIG. 3 is a modification of the invention.

Referring to FIGS. 1 and 2, there is shown an electrostatic incremental drive unit 10 having a drive shaft 11 which is adapted for continuous rotation, as by a suitable motor and gear arrangement, not shown. The shaft 11 is adapted to rotate at relatively slow speed, for example in the order of 60 r.p.m. Mounted on the drive shaft 11 is a rotor 12, FIG. 2 which is provided with a hub **12*a*, FIG. 1 through which extends a locking pin 13 for securing the rotor 12 to the drive shaft 11. The rotor 12 is made from an electrically-conducting material such, for example, as brass. Mounted on the outer surface of the rotor 12 are a plurality of rings 15—17. The rings 15—17 are made from a suitable metal such, for example, as steel. The rotor 12 is provided with a plurality of recesses 12*b* each of which is adapted to receive a compression spring 19 and a friction drive shoe 20 to provide a friction drive between the rotor 12 and the rings 15—17. Each drive shoe 20 is of electrically conductive material, such as molded graphite, in order to establish an electrical circuit between the drive shaft and the rings 15—17. The springs 19 hold the friction shoes 20 against the inner surface of the rings 15—17 and thus the rings 15—17 normally rotate with the rotor 12 and its drive shaft 11**.

Each of the rings 15—17 has bonded to its outer surface in an encircling relation faces or rims 21—23 of a suitable electrostatic resistance material. The electrostatic resistance material is semi-conductive, i.e., having a resistivity within the general range of $10^6$ to $10^7$ ohms per cubic centimeter and may be composed of a mixture of natural or synthetic rubber, an inert filler such as asbestos, conductive particles, such as carbon black, and a phenolic resin.

As may be seen in FIG. 1, the ring 15 is integral with a drive member shown as a tape capstan **15*c* over which a tape T is adapted to pass. Thus when ring 15 rotates with the rotor 12 through the friction drive, the tape capstan 15*c* likewise will rotate with the rotor 12** and drive the tape T.

Each of the rims or faces 21—23 of electrostatic resistance material is adapted to be engaged by a brake band shown in FIG. 1 as bands 25—27 respectively. The brake bands 25—27 are electrically conducting and preferably are made from a flexible material, such as thin strips of spring steel. One end of each of the bands 25—27 is adapted to be secured or anchored to an insulator member 30 and the opposite ends of the bands 25—27 are adapted to be connected to the insulator 30 by way of a tension spring 31, only one being shown in FIG. 2 in connection with band 25. It is to be understood that similar springs are provided for each of bands 26 and 27. The insulating member 30 is adapted to be carried by a support 32. A brush or wiper 33, FIG. 2, is carried by support 32 and engages the faces 21—23. The wiper 33 is made of suitable material, such as mohair, which, by its own resilience, wipes the surface of the faces as they rotate to keep them clean.

As may be seen in FIG. 1, the ring 15 is provided with a projection or lug **15*p* which is adapted to project into a recess or a slot formed by spaced shoulders 16*a* and 16*b* in the adjacent ring 16. The ring 16 likewise is provided with a projection 16*p* which is adapted to be received in a recess or slot formed by the spaced shoulders 17*a* and 17*b* on the adjacent ring 17. It will be noted that the width of the slot along the periphery of ring 16 as determined by the spacing between shoulders 16*a* and 16*b* is greater than the width of the cooperating projection 15*p* along the periphery of ring 15. It will also be noted that the width of the slot along the periphery of ring 17, as determined by the spacing between the shoulders 17*a* and 17*b* is substantially greater than the width of the cooperating projection 16*p* along the periphery of ring 16**. The purpose of this will be hereinafter explained.

As may be seen in FIG. 1, the fixed ends of the brake bands 25 and 26 are each connected by way of conductors 35 and 36 respectively to the respective stationary contacts 37 and 38 of a switch S. The movable contact 39 of switch S is connected by way of a conductor 40 to a stationary contact 41 of the switch S1. As may further be seen in FIG. 1, the brake band 27 on ring 17 is connected by way of conductor 42 to the stationary contact 43 of switch S1. The movable contact 44 of switch S1 is connected by way of conductor 45 to one side of a suitable direct current source illustrated as a battery 46. The other side of the battery 46 is connected by way of a conductor 47 to a brush or contact 48 which engages shaft 11.

With the switches S and S1 in the position shown in FIG. 1, a voltage is applied to the brake band 25 from battery 46 through conductor 45, contacts 44 and 41, conductor 40, contacts 39 and 37 and conductor 35 thereby establishing a potential difference between the electrostatic resistance material 21 and the brake band 25. This locks ring 15 against rotation creating slippage between the friction drive shoes 20 and the inner surface of the ring 15. Since the drive member or tape capstan **15*c* is integral with the ring 15, it is likewise locked and prevented from rotating with the rotor 12. The direction of rotation of the drive shaft 11 and rotor 12 is shown by the arrow in FIG. 1 and since the shoulder 16*a* of the slot in ring 16 is in engagement with the projection 15*p*, the ring 16 will also be prevented from turning with the rotor 12. Similarly, since the shoulder 17*a* of the slot in ring 17 is in engagement with the projection 16*p* on ring 16, the ring 17 likewise will be prevented from turning with the rotor 12**.

By transferring the movable contact 39 of switch S from engagement with contact 37 to engagement with contact 38, a voltage will be applied to the brake band 26 from the battery 46 through conductor 45, contacts 44 and 41, conductor 40 and contacts 39 and 38 and conductor 36 thereby establishing a potential difference between the rim 22 and the brake band 26. This will lock the ring 16 against rotation with the rotor 12 and likewise will prevent rotation of ring 17 by reason of the engagement of projection **16*p* with the shoulder 17*a* on ring 17. However, when brake band 26 is energized by transfer of contact 39 from engagement with contact 37 to engagement with contact 38, the brake band 25 will be deenergized. This permits rotation of ring 15 and the tape capstan 15*c* in the direction of the arrow until the projection 15*p* engages the shoulder 16*b* of the notch in adjacent ring 16. The capstan 15*c* thus moves a limited distance determined by the difference in width of the projection 15*p* and the cooperating slot on the ring 16. When contact 39 of switch S is again moved into engagement with contact 37, the brake band 25 is again energized, locking the ring 15 and tape capstan 15*c* against rotation. Since at this time the projection 15*p* is in engagement with the shoulder 16*b* of ring 16, the ring 16 can turn the same predetermined incremental amount as previously turned by ring 15 until shoulder 16*a* again engages projection 15*p*. By transferring movable contact 39 back and forth between stationary contacts 37 and 38 of switch S, the ring 15 and the tape capstan 15*c*** are stepped along in equal increments.

During the foregoing operation of switch S, the ring 17 moves with ring 16 by reason of engagement of projection **16*p* with the shoulder 17*a* of the slot in ring 17. The increments of advancement of the tape capstan provided by operation of switch S are relatively small, say for example in the order of about .005 inch. After a block of information has been recorded on tape T, it is desirable to separate this block from a succeeding block of information. This is accomplished by advancing the tape a greater distance than the equal increments of the information in each block. For example, the tape may be advanced in the order of ¾ inch before recording the next block of information. To provide the separation distance between blocks of recorded information, the switch S1 is operated by moving the movable contact 44 out of engagement with contact 41 and into engagement with contact 44. This applies a voltage to brake band 27 by way of a circuit extending from one side of battery 46 through conductor 45, contacts 44 and 43 and conductor 42 to brake band 27 thereby establishing a potential difference between the rim 23 and the brake band 27. This locks ring 17 against rotation with the rotor 12, but permits rings 16 and 15 to continue to turn with the rotor 12 until projection 16*p* engages shoulder 17*b* on ring 17 and until projection 15*p* on ring 15 engages shoulder 16*b* on ring 16. After this operation has been completed, movable contact 44 of switch S1 is transferred back into engagement with contact 41 and the normal stepping actions of rings 15 and 16 and tape capstan 15*c*** can be continued as described above.

Referring to FIG. 3, there is shown a modification which is generically claimed herein and is encompassed by the present invention but which is described in further detail and specifically claimed in an application Serial No. 784,298, filed on December 31, 1958, by R. E. Page and assigned to the present assignee. In the improvement shown in FIG. 3, the plurality of rings on the rotor have been replaced by a single ring 51 which includes a capstan portion **51*a* over which the tape T passes and a portion to which is bonded the electrostatic resistance material 52. The electrostatic resistance material 52 is adapted to be engaged at spaced locations by a pair of brake bands 53 and 54. The brake bands 53 and 54 are in contact with the electrostatic material 52 over an arc of 180° and the electrostatic resistance material 52 may be a single rim as shown in FIG. 3 or it may be divided into two separate rims each of which is engaged by the brake bands 53 and 54 respectively. As in the embodiment shown in FIG. 1, the ring 51 is supported on a rotor 55 which is driven by a drive shaft 56 from a continuous drive motor, not shown. The ring 51 is adapted to normally rotate with the rotor 55 by means of the friction drive shoes 57 which are carried by the rotor 55 and engage the inner surface of the drive ring 51. The drive shoes 57 have been illustrated as curved spring members which are secured to the rotor 55 as by screws 57*a*. When not restrained by either of the brake bands 53 and 54, the ring 51 is continuously being rotated by the friction drive between the rotor 55 and the ring 51**.

The brake bands 53 and 54 preferably are made from a material such as spring steel. One end of the bands 53 and 54 is connected to a support 60 by springs 61 and 62 respectively. The opposite ends of the bands 53 and 54 are connected to the support 60 by springs 63 and 64 respectively. The springs 61 and 62 have a relatively light tension as compared to the heavy tension of springs 63 and 64. The ends of the bands 53 and 54 adjacent the heavy springs 63 and 64 are provided with apertures or slots **53*a* and 54*a* which are adapted to receive stop members 65 and 66 respectively. The stop members or projections 65 and 66 are adapted to be carried by the support 60. The stops 65 and 66 located within the slots 53*a* and 54*a* limit the travel of the respective bands 53 and 54 due to imbalance of the springs 61, 63, and 62, 64 on the respective bands 53 and 54**.

In operation, the brake bands 53 and 54 are adapted to be selectively energized from a suitable potential source shown as a battery 68. The negative side of the battery 68 is connected by way of a conductor 69 to a contact 70 which is in continuous engagement with the rotating shaft 56. The positive side of the battery is connected to the movable contact 71 of a three-position switch S2. When the contact 71 is in the center position between the stationary contacts 72 and 73, the ring 51 is free to rotate with the rotor 55. When movable contact 71 is moved into engagement with contact 72, a circuit is completed to brake band 54 establishing a potential difference between the electrostatic resistance material 52 and the brake band 54. This potential difference causes an electrostatic adhesive force to be developed so that the brake band 54 adheres to the surface of material 52 and is carried along with the ring 51 against the bias of spring 64 until the lower edge of slot 54*a* engages the stop 66. At this time the ring 51 and the tape capstan 51*a* will stop while the rotor 55 continues to turn. The movement of the ring 51 is controlled by the difference in the width of the slot 54*a* along the length of band 54 and the corresponding dimension of the stop 66. As previously described, this movement preferably is equivalent to .005 inch of capstan peripheral distance.

When contact 71 is moved into engagement with contact 73, voltage will be applied to the brake band 53 and the voltage will be cut off on brake band 54. The ring 51 will rotate until the bottom of slot 53*a* engages the stop 65. This movement is equivalent to .005 inch of capstan peripheral distance. When the voltage is released on brake band 54, the heavy tension spring 64 will move the brake band 54 in the opposite direction until the upper edge of slot 54*a* engages the upper surface of stop 66. This completes a cycle and the cycle may be repeated by moving contact 71 alternately between contacts 72 and 73. It is to be understood that the movement of contact 71 will be rapid in order to prevent rotation of the ring 51 during the transfer between the contacts 72 and 73. When a block of information is recorded on the tape, it is desirable to advance the tape a substantial distance, for example about ¾ inch before recording the next block of information. This may be accomplished by moving the movable contact 71 to its center position and permitting the ring 51 to rotate with the rotor 55 through the required distance before contact 71 is again moved into engagement with contact 72 for a succeeding cycle of operation. It is to be understood that the switching arrangements have been illustrated schematically herein and that suitable electronic switching may be utilized.

It shall be understood the invention is not limited to the specific arrangements shown, and that changes and modifications may be made within the scope of the appended claims.

What is claimed is:

1. An electrostatic incremental drive suited for magnetic tape comprising a rotor adapted for continuous rotation, ring means on said rotor, said ring means including a drive member for engaging the tape, friction means between said rotor and said ring means normally to drive said ring means with said rotor, electrostatic resistance material carried by and encircling said ring means, a plurality of individual brake bands extending around and in engagement with said electrostatic resistance material, means for energizing said individual brake bands to lock at least one of the latter to said ring means, and mechanical stop means effective on said ring means in timed relation with the energization of said brake bands to permit predetermined limited rotation of said drive member of said ring means after energization of the associated brake band.

2. An electrostatic incremental drive according to claim 1 wherein said ring means comprises a plurality of rings spaced axially from each other on said rotor, said electrostatic resistance material being on each of said rings in engagement with said brake bands, and said mechanical stop means comprises projecting structure on one of said rings and a recess on an adjacent one of said rings, said projecting structure being received in said recess, and said recess having a width greater than that of said projecting structure by an amount corresponding to said predetermined limited rotation.

3. An electrostatic incremental drive according to claim 1 wherein said ring means includes a separate ring spaced axially from said drive member on said rotor, said electrostatic resistance material being on said ring, and said mechanical stop means comprises projecting structure and recess structure, said structures being disposed in cooperating relation on said separate ring and said drive member, said recess structure having a width greater than that of said projecting structure by an amount corresponding to said predetermined limited rotation.

4. An electrostatic incremental drive according to claim 1 wherein said ring means includes a plurality of rings each having said electrostatic resistance material carried thereby, and one of said rings is integral with said drive member.

5. An electrostatic incremental drive according to claim 2 wherein said second-named ring of said ring means has projecting structure thereon, said ring means including a third one of said rings adjacent to said projecting structure on said second-named ring, said third one of said rings has a recess having a width greater than the other said recess relative to said projecting structure on said second-named ring received therein to provide increased rotational movement between said ring having said recess of greater width and the adjacent second-named ring having said projecting structure.

6. An electrostatic incremental drive according to claim 2 including at least three rings having cooperating pairs of recess and projecting structure, wherein the ratio of the width of a recess to the width of the projecting structure received therein of one of said pairs is greater than such ratio for the other of said pairs.

7. An electrostatic incremental drive according to claim 1 wherein one end of each of said brake bands is connected to a tension spring.

8. An electrostatic incremental drive unit suited for magnetic tape comprising a rotor adapted for continuous rotation, ring means on said rotor, said ring means including a drive member for the tape, friction means between said rotor and said ring means normally to drive said ring means with said rotor, electrostatic resistance material encircling said ring means and bonded thereto, a plurality of individual brake bands in engagement with said electrostatic resistance material, said brake bands being energized alternately to lock one of said brake bands to said electrostatic resistance material, and mechanical stop means effective on said ring means to permit predetermined limited rotation of said drive member afer locking one of said brake bands to said electrostatic resistance material.

9. An electrostatic incremental drive unit suited for magnetic tape comprising a rotor adapted for continuous rotation, a plurality of rings and a tape capstan on said rotor, means for coupling said capstan to one of said rings, friction means between said rotor and said rings normally to drive said rings with said rotor, electrostatic resistance material on each of said rings, a plurality of individual brake bands, one of said brake bands in engagement with said electrostatic resistance material on each of said rings, means for energizing said individual brake bands to lock one of said bands to said electrostatic resistance material on its associated ring and prevent rotation of said associated ring with said rotor, and mechanical stop means effective between adjacent rings to permit only a predetermined limited further rotation of the other of said rings and said capstan.

10. An electrostatic incremental drive unit according to claim 9 wherein said tape capstan is integral with one of said rings.

11. An electrostatic incremental drive unit suited for magnetic tape comprising a rotor adapted for continuous rotation, a pair of rings on said rotor, a drive member for the tape, one of said rings being integral with said drive member, friction means between said rotor and said rings normally to drive said rings and said drive member with said rotor, electrostatic resistance material on each of said rings, a pair of brake bands, said brake bands being in engagement with said electrostatic resistance material on the respective ones of said rings, a notch in the edge of one of said rings, a projection on the other of said rings, said projection extending into said notch and having a width less than the corresponding dimension of said notch to permit limited movement of one of said rings when the other ring of said pair is locked against rotation by the associated one of said brake bands.

12. An electrostatic incremental drive unit according to claim 11 including a third ring on said rotor, said third ring having electrostatic resistance material thereon, a brake band in engagement with said electrostatic resistance material on said third ring, a slot in said third ring, and a projection on said ring of said pair of rings adjacent to said third ring, said last-named projection extending into the slot on said third ring to permit limited rotation of said pair of rings and said drive member for the tape after energization of said brake band on said third ring to lock said third ring against rotation with said rotor.

References Cited in the file of this patent

UNITED STATES PATENTS

| | | |
|---|---|---|
| 1,871,272 | Jongedyk | Aug. 9, 1932 |
| 2,073,983 | Anderson | Mar. 16, 1937 |
| 2,338,305 | Simmon | Jan. 4, 1944 |
| 2,541,013 | Clutz | Feb. 13, 1951 |
| 2,568,824 | Rahbek | Sept. 25, 1951 |
| 2,630,512 | Rahbek | Mar. 3, 1953 |
| 2,850,907 | Foster | Sept. 9, 1958 |
| 2,850,908 | Foster | Sept. 9, 1958 |

FOREIGN PATENTS

| | | |
|---|---|---|
| 438,860 | Germany | Dec. 28, 1926 |